United States Patent
Akaike et al.

(10) Patent No.: US 10,144,312 B2
(45) Date of Patent: Dec. 4, 2018

(54) VEHICLE SEAT

(71) Applicant: TOYOTA BOSHOKU KABUSHIKI KAISHA, Aichi-ken (JP)

(72) Inventors: Fumitoshi Akaike, Aichi-ken (JP); Koji Kaneda, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/280,193

(22) Filed: Sep. 29, 2016

(65) Prior Publication Data
US 2017/0096085 A1    Apr. 6, 2017

(30) Foreign Application Priority Data

Oct. 1, 2015    (JP) .................................. 2015-196004

(51) Int. Cl.
*B60N 2/22*    (2006.01)
*B64D 11/06*    (2006.01)
*B60N 2/68*    (2006.01)
*B61D 33/00*    (2006.01)

(52) U.S. Cl.
CPC ................. *B60N 2/22* (2013.01); *B60N 2/68* (2013.01); *B61D 33/00* (2013.01); *B64D 11/0639* (2014.12)

(58) Field of Classification Search
CPC ...... B60N 2/22; B60N 2/0232; B60N 2/2222; B60N 2/449; B60N 2/4882; B60N 2/643; B60N 2/68; B60N 2/686; B60N 2002/0272; B64D 11/0639; B61D 33/00
See application file for complete search history.

(56) References Cited

U.S. PATENT DOCUMENTS 6,170,786 B1 *    1/2001    Park .................... B60N 2/0232
                                                          248/274.1
6,375,119 B2 *    4/2002    Park .................... A47C 1/0352
                                                          108/44

(Continued)

FOREIGN PATENT DOCUMENTS

JP    5-76860    10/1993
JP    2015-20527    2/2015

OTHER PUBLICATIONS

U.S. Appl. No. 15/280,147 to Fumitoshi Akaike et al., filed Sep. 29, 2016.

*Primary Examiner* — Philip F Gabler
(74) *Attorney, Agent, or Firm* — Greenblum & Bernstein, P.L.C.

(57) ABSTRACT

A vehicle seat includes: a seating portion configured to support a seated occupant in a seating posture; a shell portion configured to cover the circumference of the seating portion including side portions of the seated occupant from a rear side of the occupant; a first moving device that is configured to move a relative position of the seating portion with respect to a vehicle; and a second moving device that is configured to move a relative position of the shell portion with respect to the seating portion, the second moving device being configured to move at least side portions of the shell portion to a first position at which the side portions of the seated occupant is covered by the shell portion and to a second position at which the side portions of the seated occupant is uncovered by the shell portion.

9 Claims, 16 Drawing Sheets

(56) References Cited

U.S. PATENT DOCUMENTS

| | | | | |
|---|---|---|---|---|
| 6,565,153 B2 * | 5/2003 | Hensel | ............... | A47C 7/38 |
| | | | | 297/285 |
| 7,021,706 B2 * | 4/2006 | Aufrere | ............ | B60N 2/42745 |
| | | | | 297/216.13 |
| 2011/0121624 A1 * | 5/2011 | Brncick | ............ | B60N 2/0232 |
| | | | | 297/284.2 |
| 2015/0028634 A1 * | 1/2015 | Scherello | ............ | B60N 2/4802 |
| | | | | 297/163 |
| 2017/0096084 A1 * | 4/2017 | Akaike | ............ | B64D 11/0639 |
| 2017/0096085 A1 * | 4/2017 | Akaike | ............ | B64D 11/0639 |
| 2017/0217341 A1 * | 8/2017 | Kaneda | ............ | B60N 2/4492 |
| 2017/0291511 A1 * | 10/2017 | Akaike | ............ | B60N 2/427 |
| 2017/0297460 A1 * | 10/2017 | Akaike | ............ | B60N 2/42745 |

* cited by examiner

US 10,144,312 B2

VEHICLE SEAT

CROSS-REFERENCE TO RELATED APPLICATION

This application claims priorities from Japanese Patent Application No. 2015-196004 filed on Oct. 1, 2015, the entire subject matters of which is incorporated herein by reference.

TECHNICAL FIELD

The present invention relates to a vehicle seat on which an occupant sits and is mounted on a vehicle such as automobiles, airplanes, vessels and trains.

BACKGROUND

There is a bucket type seat having improved support properties of an occupant as a sports type seat for a vehicle (see JP-UM-A-H05(1993)-076860). Further, there is a shell type seat which provides personal aesthesis by partially blocking side visibility of the seated occupant (JP-A-2015-4020527).

Both of the bucket type seat and the shell type seat improve the support properties by covering the side portions of the seated occupant, and provide improved personal aesthesis. However, depending on the placed situations and the occupant's preference, when the side portions are covered, senses of surrounding and tightness may be imparted to the occupant.

The bucket type seat disclosed in JP-UM-A-H05(1993)-076860 is equipped with an inner seat which supports a seated occupant, and a bucket seat body which covers the outside of the inner seat. When the occupant gets on or off the inner seat, the bucket seat body moves rearward with respect to the inner seat to improve the getting on/off properties.

According to the configuration disclosed in JP-UM-A-H05(1993)-076860, when the bucket seat body is moved rearward at the time of getting on and off the seat, there is no cover which covers the occupant's side portions, which can eliminate the senses of surrounding and tightness to the occupant. However, even if there are no senses of surrounding and tightness at the time of getting on and off the seat, this is meaningless, and in the configuration disclosed in JP-UM-A-H05(1993)-076860, it may not be possible to eliminate the covers of the occupant's side portions at any time if necessary when the occupant is seated on the seat.

SUMMARY

The present disclosure is made in consideration of the above-mentioned circumstances, and one of objects of the present disclosure is to provide a vehicle seat such as a bucket type seat and a shell type seat equipped with a cover which covers side portions of a seated occupant, in which senses of surrounding and tightness imparted to the seated occupant caused by the covered side portions are suppressed by enabling the cover to be removed at any time if necessary.

According to an illustrative embodiment of the present disclosure, there is provided a vehicle seat includes: a seating portion configured to support a seated occupant in a seating posture; a shell portion configured to cover the circumference of the seating portion including side portions of the seated occupant from a rear side of the occupant; a first moving device that is configured to move a relative position of the seating portion with respect to a vehicle; and a second moving device that is configured to move a relative position of the shell portion with respect to the seating portion, the second moving device being configured to move at least side portions of the shell portion to a first position at which the side portions of the seated occupant is covered by the shell portion and to a second position at which the side portions of the seated occupant is uncovered by the shell portion.

DETAILED DESCRIPTION

Figure 1:
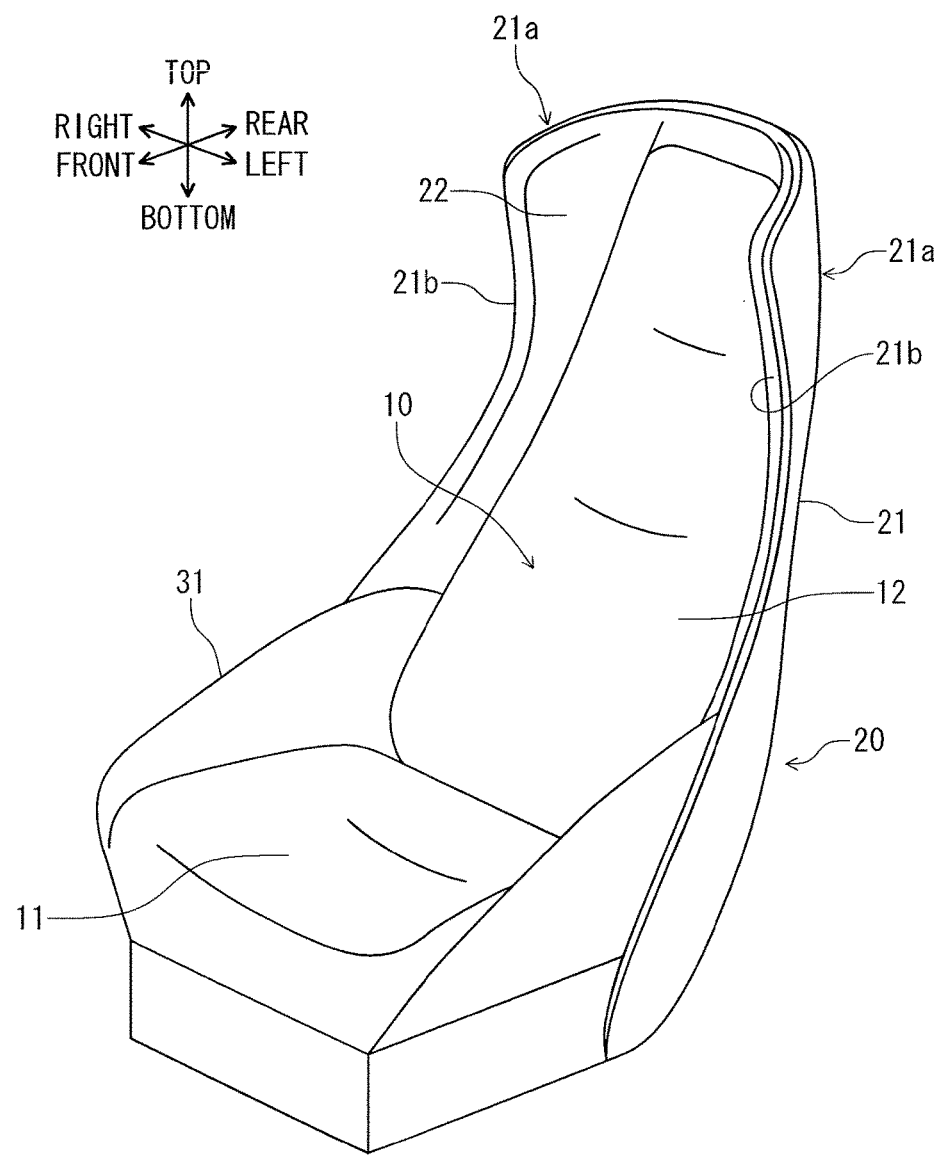
FIG. 1 is a perspective view of an embodiment according to the present disclosure, illustrating a state in which a shell portion is integrated with a seating portion without separating.
Figure 2:
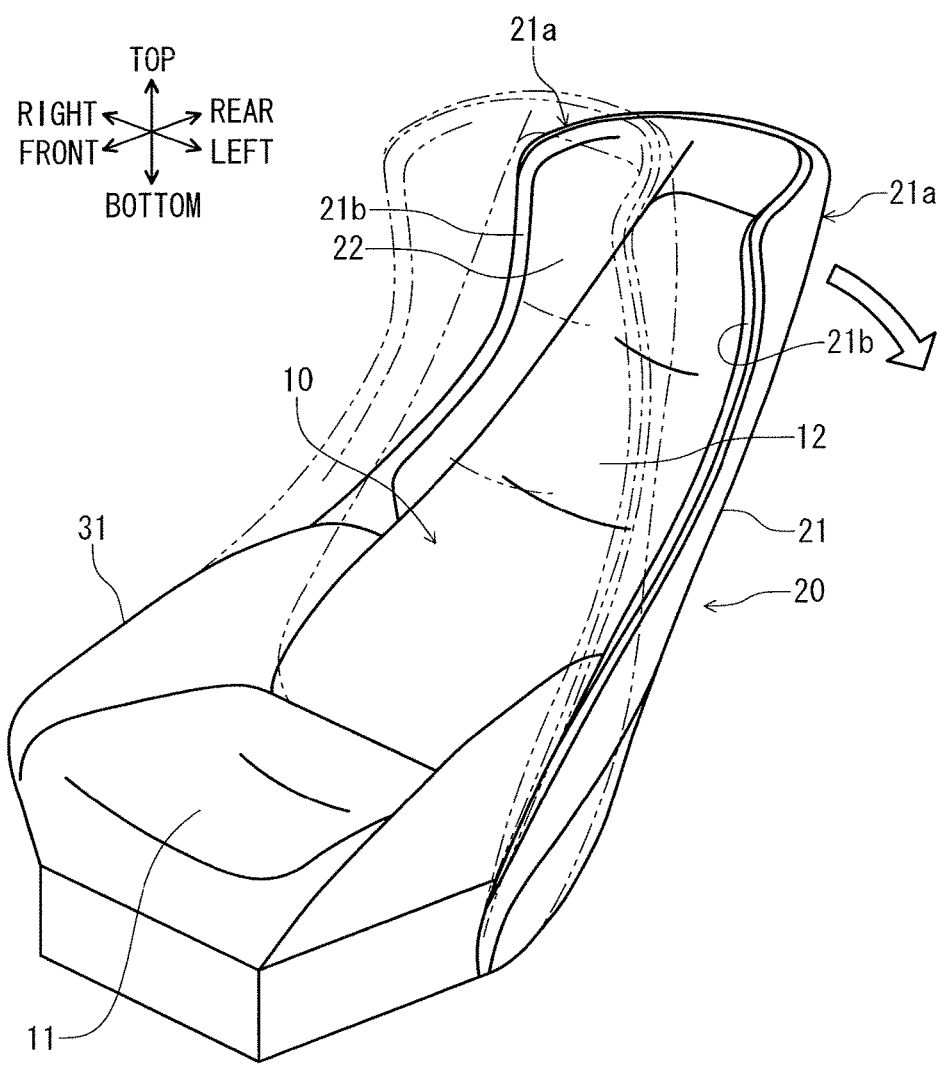
FIG. 2 is a perspective view similar to FIG. 1, illustrating a state in which a seat back portion of the seating portion is tilted rearward, while integrating the shell portion to the seating portion without separating.
Figure 3:
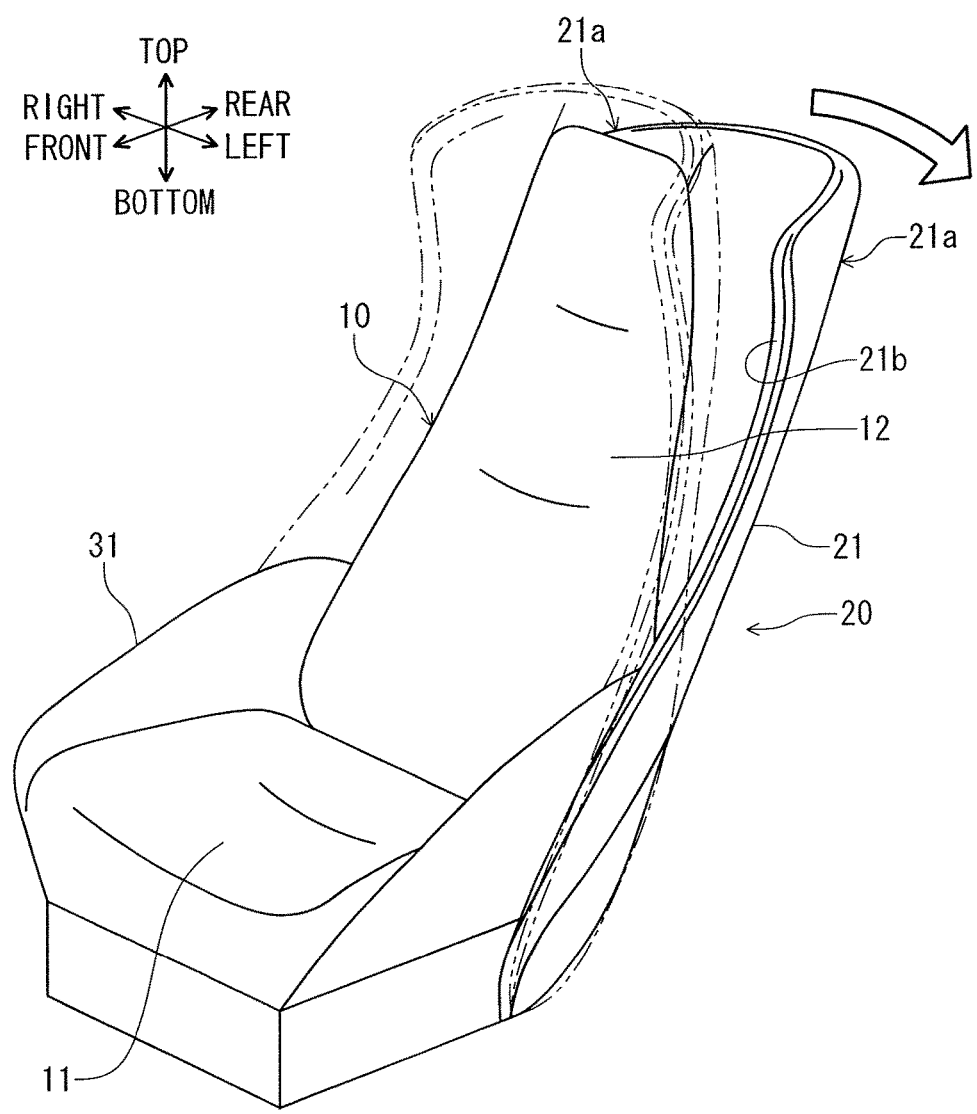
FIG. 3 is a perspective view similar to FIG. 1, illustrating a state in which the shell portion is spaced apart from the seating portion.

FIGS. 1 to 3 illustrate an exterior of a vehicle seat according to an embodiment according to the present disclosure. This seat is a shell type seat which provides a personal aesthesis to a seated occupant, and both side portions of a seating portion 10 are covered with a shell portion 20. Here, the seat includes the seating portion 10 and the shell portion 20 configured as separate members. In the following description, the respective directions will be described based on a direction viewed from the occupant seated on the seat.

The seating portion 10 which supports the occupant in a seating posture includes a seat cushion portion 11 and a seat back portion 12. The seat cushion portion 11 forms a seat portion at the bottom of the occupant, and the seat back portion 12 forms a backrest at the occupant's back. As it will be described below, the seat back portion 12 is able to adjust a rear tilt angle relative to the seat cushion portion 11 by a first reclining mechanism behind the seat cushion portion 11. As with a general seat for a vehicle, the seat cushion portion 11 and the seat back portion 12 are configured by laminating a urethane pad as an elastic material on a frame as a frame member and by covering a seat cover thereon as a skin material. The seat cushion portion 11 may be configured to freely move on a floor for installing the seat in the longitudinal and the lateral directions, by a longitudinal slide rail and a lateral slide rail.

The regions around the side portions from the rear of the seating portion 10 are covered with the shell portion 20. Specifically, the shell portion 20 includes an upper shell 21 and an under shell 31. The upper shell 21 is disposed behind the seating portion 10 including the seat cushion portion 11 and the seat back section 12, and the under shell 31 is disposed on both side portions of the seating portion 10. The under shell 31 is fixed to the seat cushion portion 11. As described below, the upper shell 21 is fixed to the seat cushion portion 11 via a second reclining mechanism, and is capable of adjusting the rear tilt angle relative to the seat cushion portion 11.

Each of the upper shell 21 and the under shell 31 is formed by integral molding of resin, and a frame as a frame member is incorporated in the interior of the resin molded article, as an insert material of insert molding. On the side facing the seated occupant of the resin molded article constituting the upper shell 21 and the under shell 31, an elastic body 22 is provided, and the elastic body 22 includes a urethane pad as an elastic material, and a skin material covering the surface thereof.

The shape and structure of the shell portion 20 including the upper shell 21 and the under shell 31 may be adopted as various types depending on the design concept of the seat. The seat of this embodiment is a shell type seat which provides a personal aesthesis, and sets the shell portion 20 as a shape and a structure that can provide the personal aesthesis to the seated occupant. When it is desired to provide the seat as a sport seat, the shell portion 20 can be set to a shape and a structure like a bucket seat.

As described above, the seat back portion 12 and the upper shell 21 are able to individually adjust the rear tilt angle with respect to the seat cushion portion 11. Therefore, as illustrated in FIGS. 1 and 2, in a state in which the seat back portion 12 and the upper shell 21 integrally overlap in the longitudinal direction, it is possible to adjust the rear tilt angle of the seat back portion 12 and the upper shell 21 relative to the seat cushion portion 11 (see FIGS. 5 and 6). In this state, as illustrated in FIG. 7, because both side portions of the seated occupant P are covered with both the side portions 21a of the upper shell 21, the personal aesthesis is imparted to the occupant P.

Figure 8:
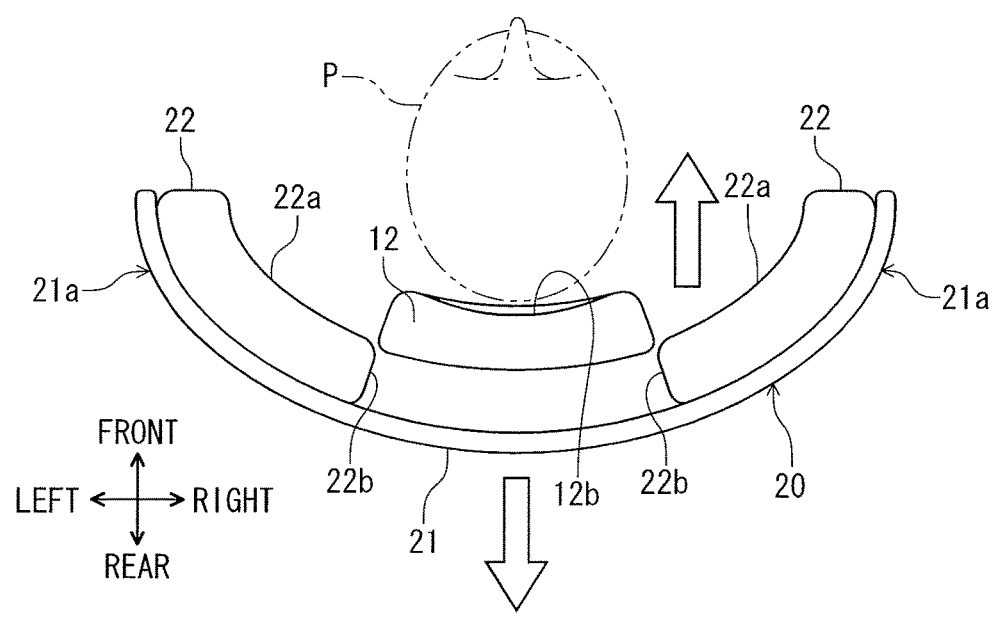
FIG. 8 is a plan view similar to FIG. 7, illustrating a state in which the shell portion is spaced apart from the seating portion.

As illustrated in FIGS. 3 and 8, it is possible to space the upper shell 21 apart from the seat back portion 12. In this state, because both side portions of the upper half body of the seated occupant P are not covered with both side portions 21a of the upper shell 21, or because the amount of covered portions is small, the occupant P may feel sense of openness without senses of surrounding and tightness.

Figure 7:
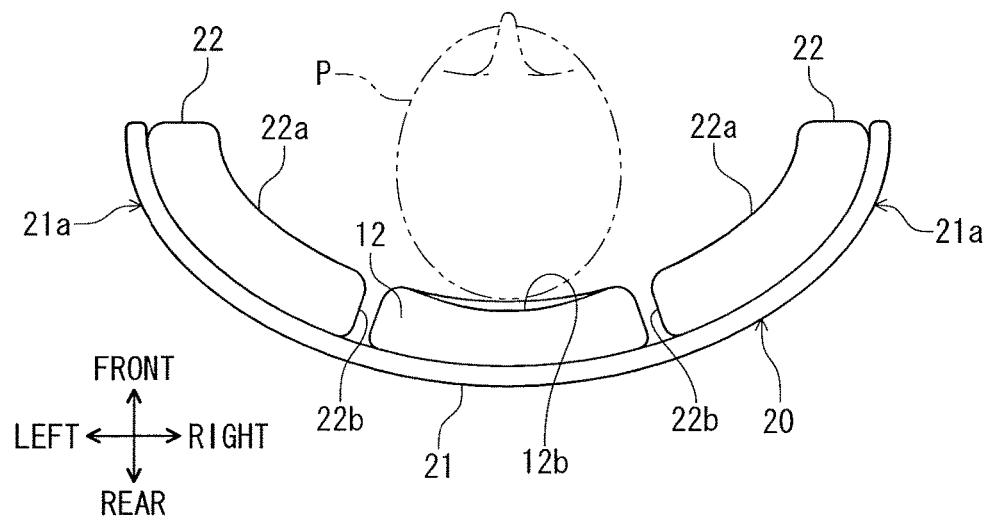
FIG. 7 is a plan view of the above-described embodiment, illustrating a state in which the shell portion is integrated with the seating portion without separating.

As illustrated in FIG. 7, the seating surface of the occupant P of the seat back portion 12 has a shape that wraps around the back of the seated occupant P from the back and side, and the seating side of the occupant P is formed by a recessed curved surface 12b. In a state in which the shell portion 20 integrally overlaps the seating portion 10 in the longitudinal direction, the occupant P side of the elastic body 22 of the upper shell 21 is continued to the curved surface 12b of the seat back portion 12, and is configured by a curved surface 22a that laterally extends from the curved surface 12b.

Therefore, as illustrated in FIG. 8, in a state in which the shell portion 20 is spaced apart from the seating portion 10, the back of the occupant P is stably supported by the curved surface 12b of the seat back portion 12. As illustrated in FIG. 7, in a state in which the shell portion 20 integrally overlaps the seating portion 10 in the longitudinal direction, on the curved surface 12b of the seat back portion 12, a surface for receiving the back of the occupant P extends to be connected to the curved surface 22a of the elastic body 22 of the upper shell 21 (see FIG. 4). Thus, the occupant P can secure a wide space therearound and take a relaxed posture.

Figure 9:
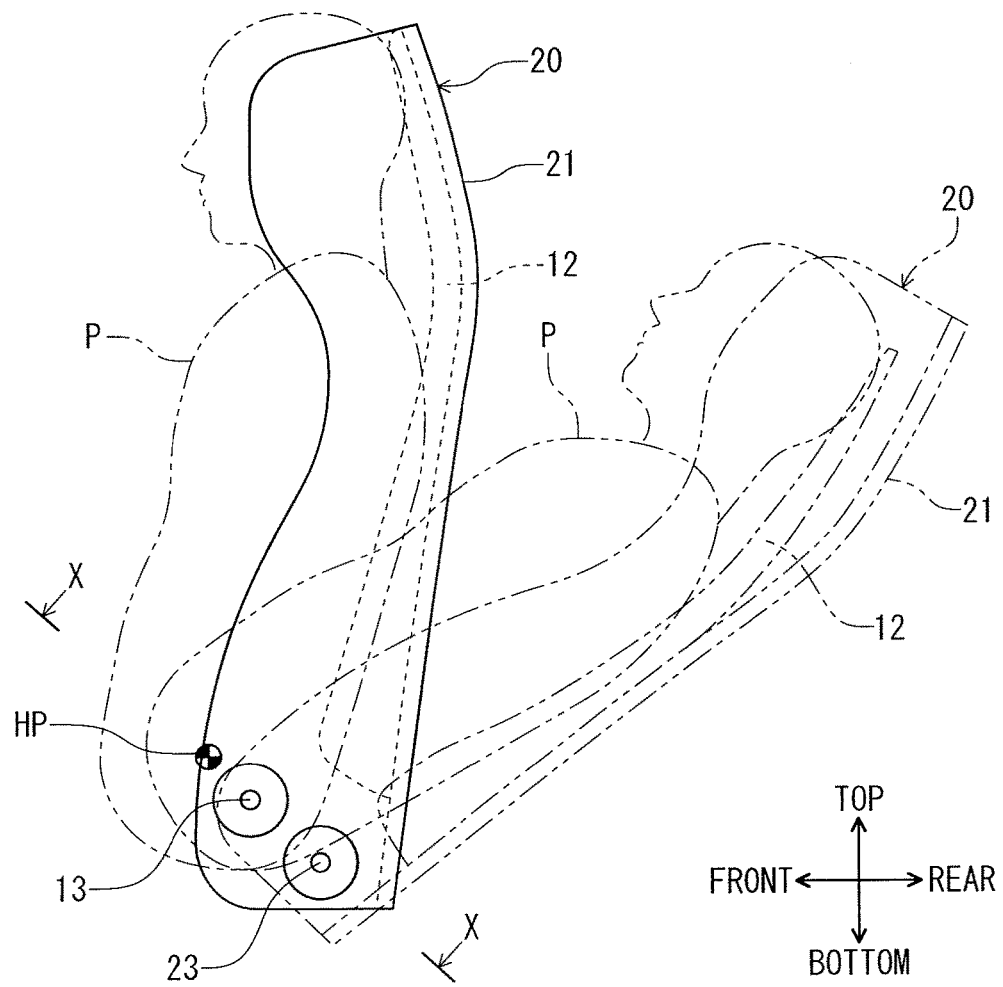
FIG. 9 is an explanatory diagram of an operation of the above-described embodiment, illustrating a tilt angle adjustment operation of the seat back portion of the seating portion.

As illustrated in FIG. 9, the seat back portion 12 is able to adjust the rear tilt angle relative to the seat cushion portion 11 by the first reclining mechanism (corresponding to the first moving mechanism of the present disclosure) 13. The upper shell 21 is able to adjust the rear tilt angle relative to the seat cushion portion 11 by the second reclining mechanism (corresponding to the second moving mechanism of the present disclosure) 23. A rotational center of the second reclining mechanism 23 is disposed to be spaced apart rearward and downward from a hip point HP of the seated occupant P. In other words, the rotational center of the second reclining mechanism 23 is located in the fourth quadrant in the plane coordinate by the horizontal axis and vertical axis intersecting with each other at the hip point HP. Further, the rotational center of the first reclining mechanism 13 is located at a position closer to the hip point HP of the seated occupant P than the rotational center of the second reclining mechanism 23. The second reclining mechanism 23 corresponds to the moving mechanism of the present disclosure.

As a result, when adjusting the rear tilt angle of the seat back portion 12 of the seating portion 10, since the rotational centers of the hip point HP and the seat back portion 12 as the rotational center of the upper half body of the occupant P are close to each other, the relative displacement between the change in the position of the back of the occupant P and the change in the position of the seating surface of the seat back portion 12 is reduced. Therefore, when increasing the rear tilt angle of the seat back portion 12, it is possible to suppress the discomfort in which cloth is displaced and rises in the back of the occupant P due to the relative displacement.

Meanwhile, when adjusting the seat tilt angle of the upper shell 21 at the same time as the seat back portion 12, since the rotational centers of the hip point HP and the upper shell 21 as the rotational center of the upper half body of the occupant P are spaced apart from each other, the relative displacement between the change in position of the upper half body of the occupant P and the change in the position of the upper shell 21 increases. That is, it is possible to increase the height in the seating height direction of the occupant P in the upper shell 21 relative to the seat cushion portion 11. Therefore, when increasing the rear tilt angle of the upper shell 21, by the relative displacement, in the normal mode indicated by a solid line in FIG. 9, the upper shell 21 located at a position lower than the seating height of the occupant P relatively rises to the position equal to the seating height of the occupant P in the comfort mode illustrated by a virtual line in FIG. 9. Therefore, while imparting the personal aesthesis to the occupant P in the comfort mode, as illustrated in FIG. 5, it is possible to ensure a predetermined distance 1 between the upper end of the upper shell 21 and a ceiling L of the vehicle in the normal mode.

Because the rotational centers of both of the seat back portion 12 and the occupant P are close to each other, the position of the seat back portion 12 relative to the occupant P is maintained substantially constant, regardless of the change in the rear tilt angle of the seat back portion 12. As a result, in the normal mode illustrated by the solid line in FIG. 9, the upper end position of the upper shell 21 and the upper end position of the seat back portion 12 are substantially the same at the height in the seating height direction of the occupant P, and meanwhile, in the comfort mode illustrated by the virtual line in FIG. 9, the upper end position of the upper shell 21 becomes higher at the height in the seating height direction of the occupant P than the upper end position of the seat back portion 12.

Figure 4:
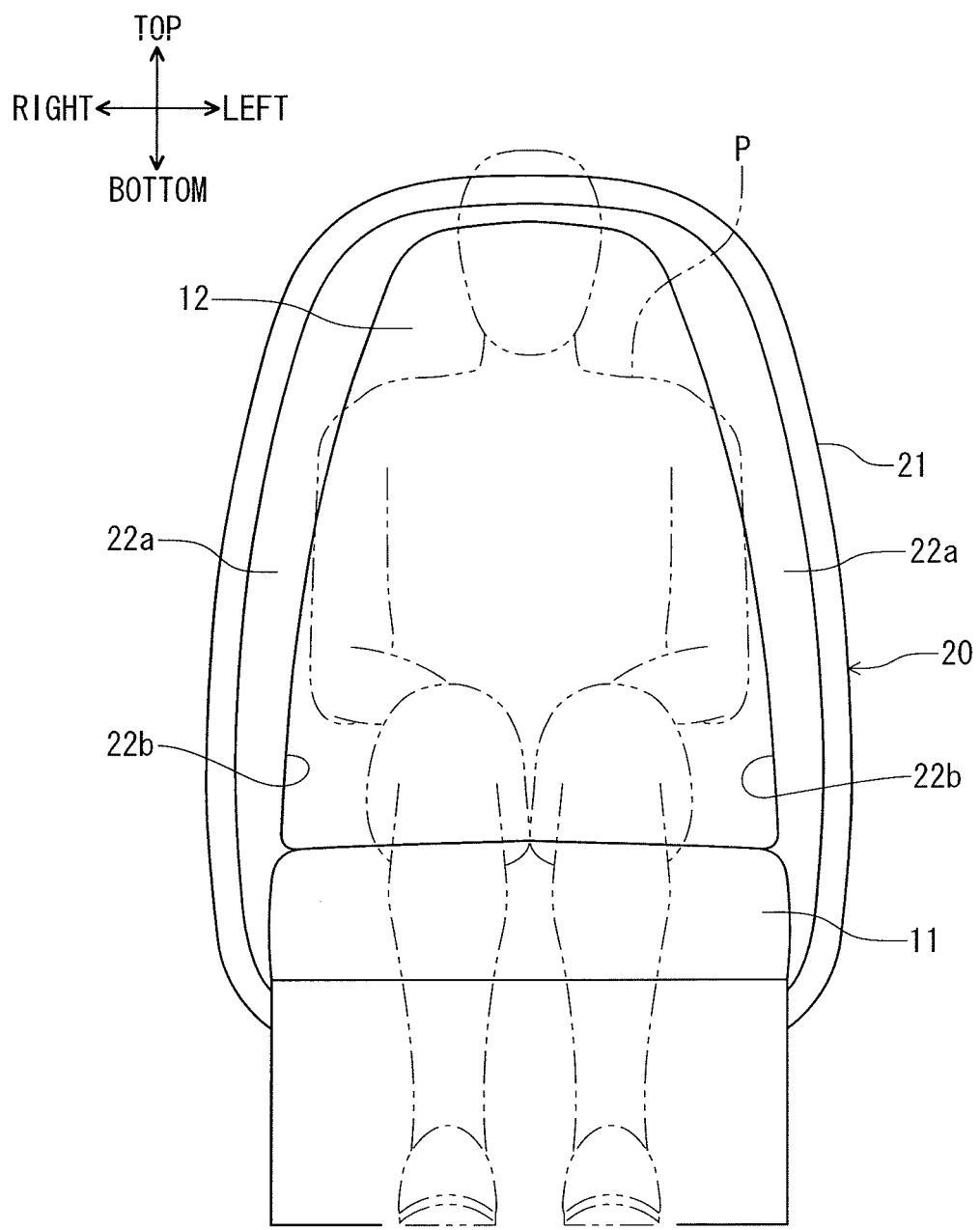
FIG. 4 is a front view of the above-described embodiment.
Figure 5:
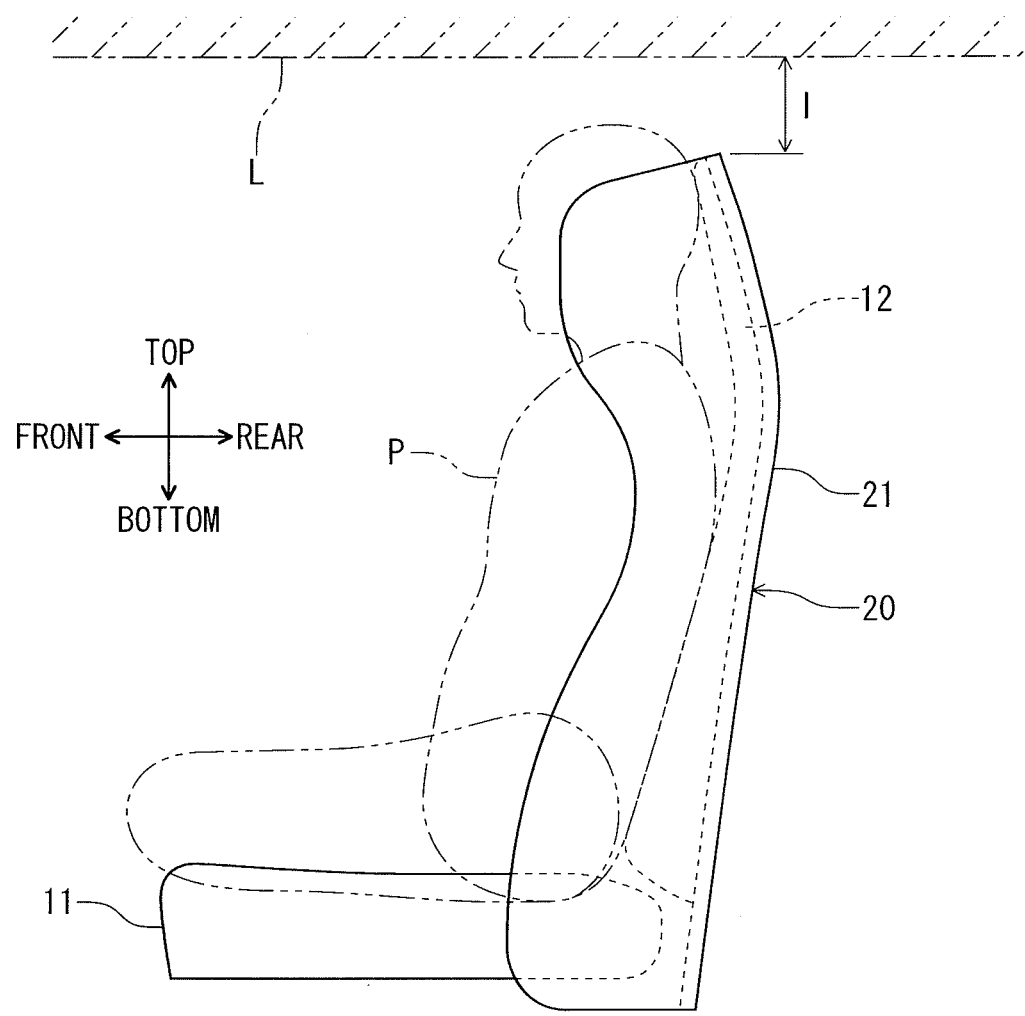
FIG. 5 is a side view of the above-described embodiment, illustrating a state in which a seating posture is in a normal mode.

As illustrated in FIGS. 4 and 5, when the seat back portion 12 and the upper shell 21 are located at the positions of the normal mode, the seat back portion 12 is fitted to a notch portion 22b formed in the elastic body 22 of the upper shell 21. That is, the elastic body 22 of the upper shell 21 is formed with the notch portion 22b to correspond to the outer shape of the seat back portion 12.

Figure 6:
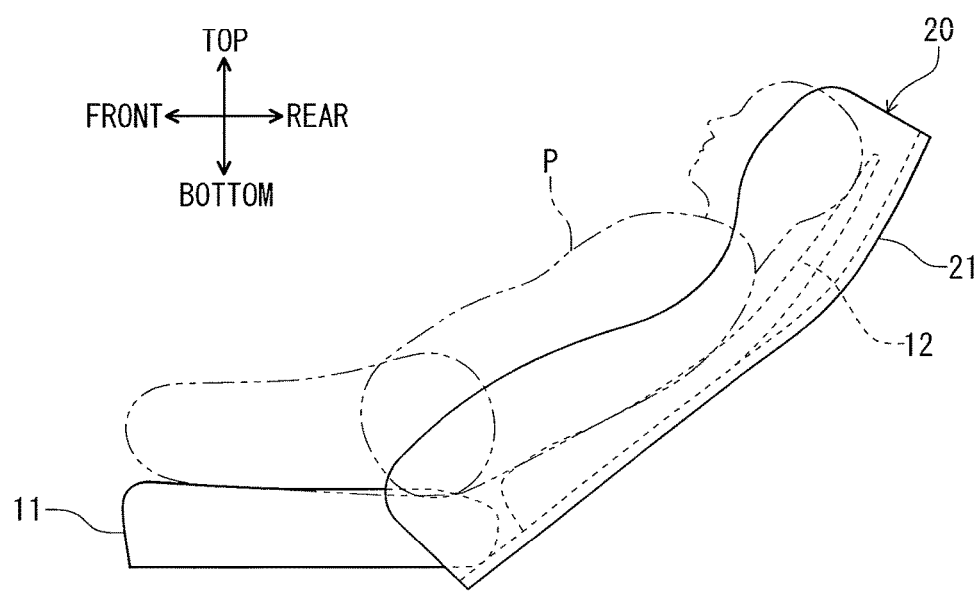
FIG. 6 is a side view of the above-described embodiment, illustrating a state in which the seating posture is in a comfort mode.

As illustrated in FIG. 6, when the seat back portion 12 and the upper shell 21 enter the comfort mode, the upper shell 21 moves relatively upward with respect to the seat back portion 12. Therefore, as illustrated in FIG. 4, a lower part of a boundary portion between the seat back portion 12 and the upper shell 21 is formed to be gradually wider than an upper part thereof. In the comfort mode, along with the relative movement of the seat back portion 12 and the upper shell 21, a gap is formed at the boundary portion.

As illustrated in FIG. 4, the lower part of the upper shell 21 is greater in a lateral width than the upper part thereof. Therefore, in the comfort mode, when the upper shell 21 moves relatively upward with respect to the seat back portion 12, the occupant P is located in the wide region of the upper shell 21. Therefore, the occupant P can take a comfortably relaxed posture.

Figure 10:
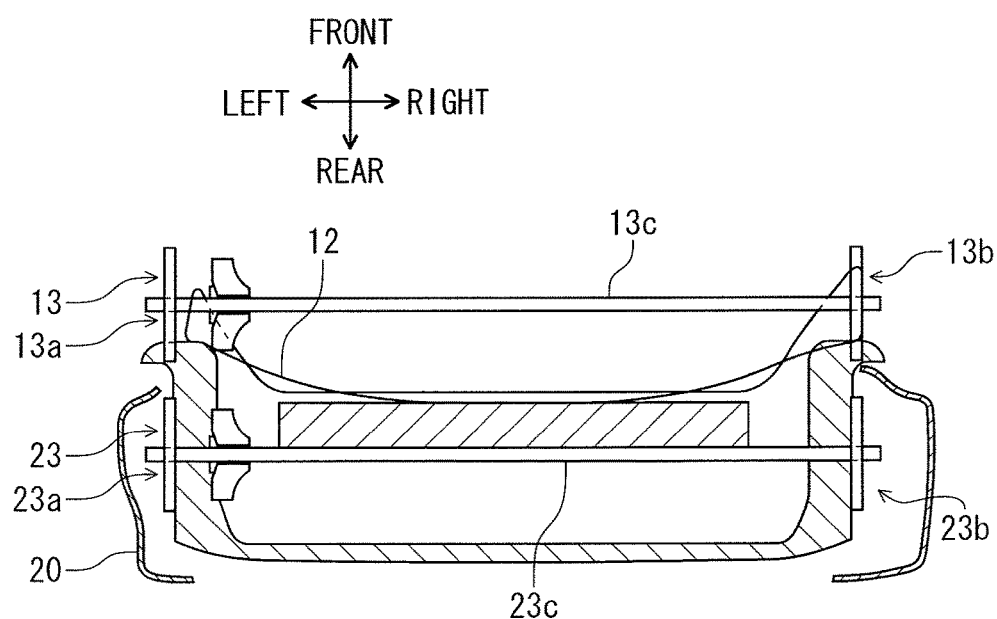
FIG. 10 is a cross-sectional view taken along the line X-X of FIG. 9 as viewed from the arrow direction.

As illustrated in FIG. 10, the first reclining mechanism 13 is configured so that a driving-side recliner 13a and a driven-side recliner 13b are connected by a connecting rod 13c. Therefore, when the driving-side recliner 13a is driven by a first motor, the driven-side recliner 13b is also driven via the connecting rod 13c in conjunction with each other. The driving-side recliner 13a and the driven-side recliner 13b are rotatably coupled between the rear both side portions of the seat cushion portion 11 and the lower both side portions of the seat back portion 12.

The second reclining mechanism 23 has the same configuration as the first reclining mechanism 13. That is, the second reclining mechanism 23 is configured so that a driving-side recliner 23a and a driven-side recliner 23b are connected to each other by a connecting rod 23c. The driving-side recliner 23a and the driven-side recliner 23b are rotatably coupled between the rear both side portions of the seat cushion portion 11 and the lower both side portions of the upper shell 21.

Figure 12:
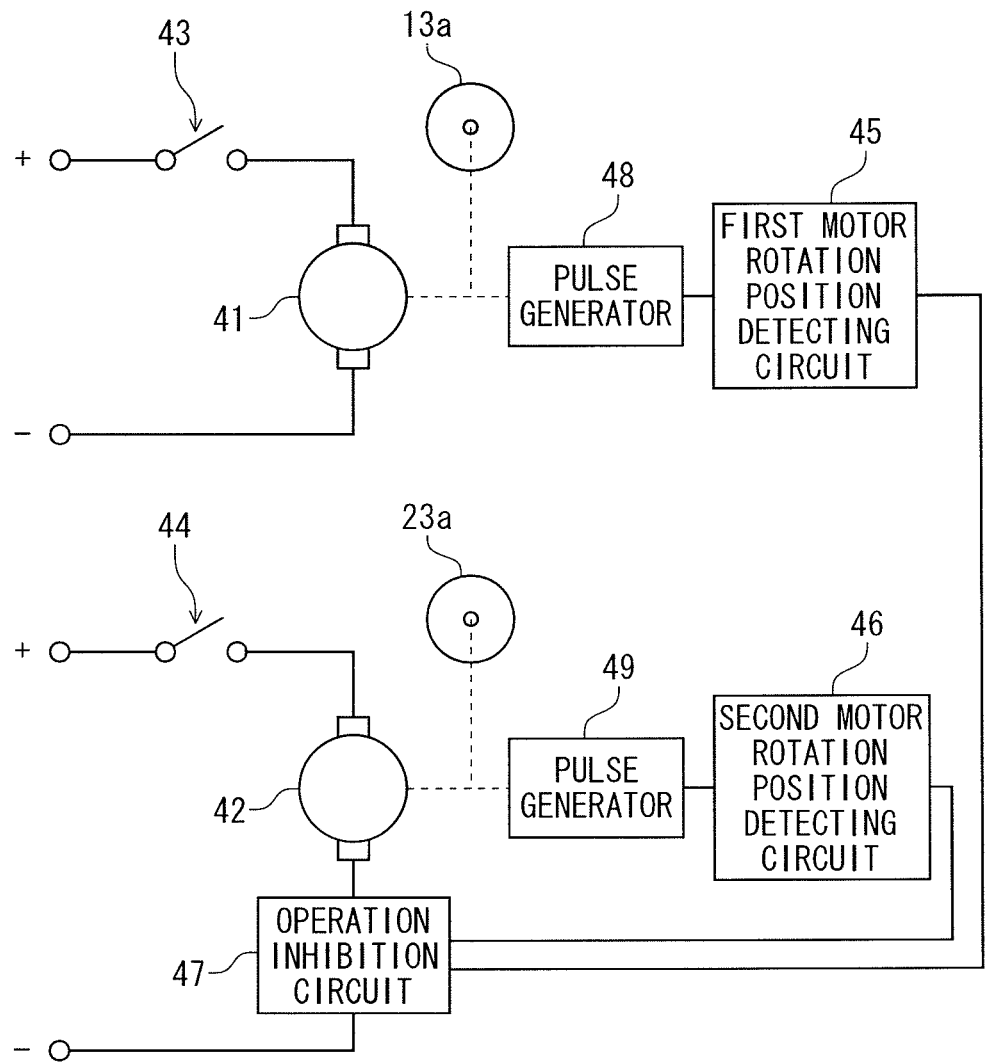
FIG. 12 is an electric circuit diagram of the above-mentioned embodiment.

As illustrated in FIG. 12, a first motor 41 is configured to rotationally drive the driving-side recliner 13a of the first reclining mechanism 13, and is connected to a power supply via a switch 43 that is optionally on/off operated. The first motor 41 is configured to generate a pulse signal at every predetermined angular rotation by a pulse generator 48, and a first motor rotation position detecting circuit (equivalent to the first detector of the present disclosure) 45 is configured to detect the rotational position of the first motor 41 based on the pulse signal count by receiving the pulse signal.

Meanwhile, a second motor 42 is configured to rotationally drive the driving-side recliner 23a of the second reclining mechanism 23, and is connected to a power supply via a switch 44 which is optionally on/off operated. The second motor 42 is configured similarly to the first motor 41, and the second motor rotation position detecting circuit (equivalent to the second detector of the present disclosure) 46 is also configured similarly to the first motor rotation position detecting circuit 45, and is configured to detect the rotational position of the second motor 42 based on the pulse signal count from a pulse generator 49.

The detection outputs of the first motor rotation position detecting circuit 45 and the second motor rotation position detecting circuit 46 are supplied to an operation inhibition circuit 47 (equivalent to the separation regulating mechanism and the movement inhibiting unit of the present disclosure). When the rotational position of the second motor 42 detected by the second motor rotation position detecting circuit 46 is spaced apart from the rotational position of the first motor 41 detected by the first motor rotation position detecting circuit 45 by a predetermined amount or more, the operation inhibition circuit 47 cuts off the power supply circuit of the second motor 42 to stop the operation of the second motor 42. The rotational position of the first motor 41 corresponds to the rear tilt angle of the seat back portion 12, and the rotational position of the second motor 42 corresponds to the rear tilt angle of the upper shell 21. Therefore, the operation inhibition circuit 47 regulates the relative spaced distance of the upper shell 21 with respect to the seat back portion 12 by a predetermined amount to prevent the upper shell 21 from being spaced apart from the seat back portion 12 by a predetermined amount or more.

In this way, because the upper shell 21 is configured not to be spaced apart from the seat back portion 12 by a predetermined amount or more, strength required as a seat for collision safety and the like can be secured by the combined strength of the seat back portion 12 and the upper shell 21.

Figure 13:
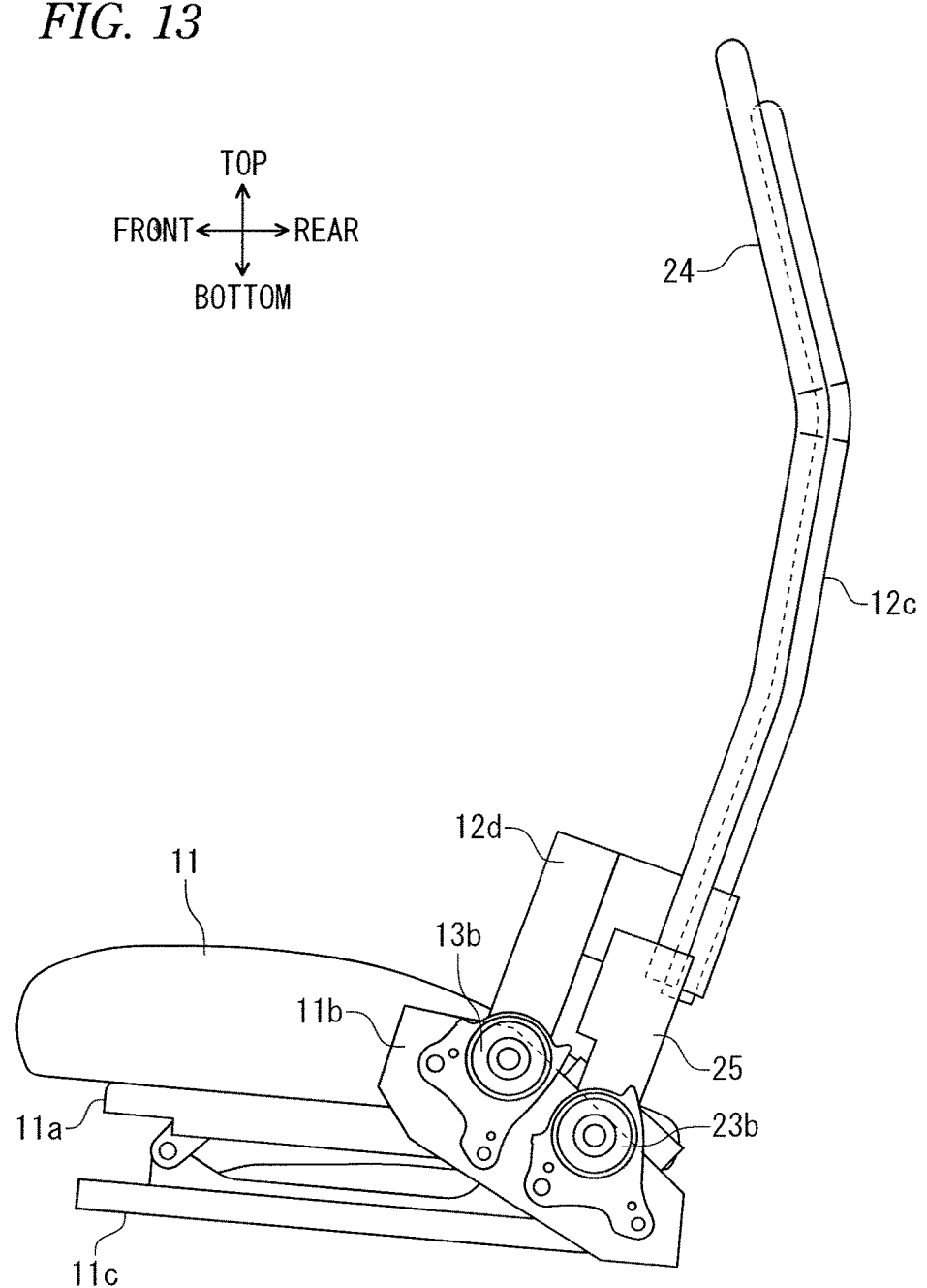
FIG. 13 is a side view illustrating a frame structure of the seating portion and the shell portion of the above-described embodiment.
Figure 14:
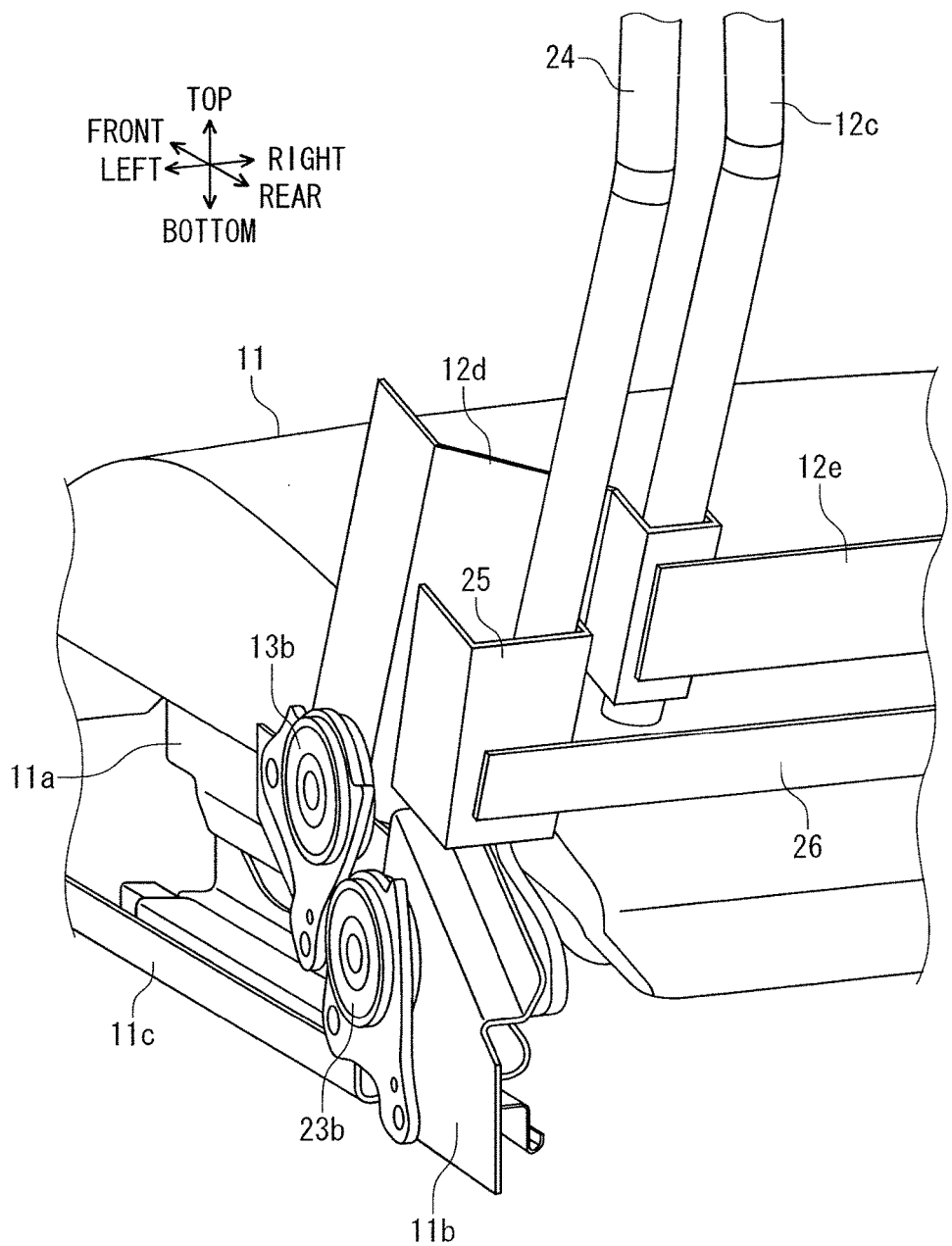
FIG. 14 is a perspective view illustrating the same frame structure as in FIG. 13.

FIGS. 13 and 14 illustrate the frame structure of the seating portion 10 and the upper shell 21. A cushion frame 11a of the seat cushion portion 11 is configured to be supported on a slide rail 11c as in a general vehicle seat. A bracket 11b with a front upward inclination is fixed to both of the left and right outer sides of the cushion frame 11a (only the left side is illustrated in FIGS. 13 and 14). The recliner of the first reclining mechanism 13 (the driven-side recliner 13b is illustrated in FIGS. 13 and 14) is fixed to the bracket 11b on the front upper side along the inclination, and the recliner of the second reclining mechanism 23 (the driven-side recliner 23b is illustrated in FIGS. 13 and 14) is fixed to the bracket 11b on the rear lower side thereof.

The back frames 12c and 24 serving as frame members of the seat back portion 12 and the upper shell 21 of the seating portion 10 are formed by mutually similar shaped and approximately inverted U-shaped pipe. The back frames 12c and 24 are disposed such that the back frame 12c is fitted to the back frame 24 in a positional relation that the back frame 12c is located inward and slightly rearward with respect to the back frame 24. Each of the back frames 12c and 24 is fixed to the bracket 11b via each recliner (the driving-side recliners 13a and 23a and the driven-side recliners 13b and 23b) and the brackets 12d and 25 to be adjustable the rear tilt angle. Further, the lower panels 12e and 26 are fixed to the rear portions of the brackets 12d and 25 to couple each of the brackets 12d and 25 disposed on both of the left and right sides.

The states of FIGS. 13 and 14 illustrate a state in which the seating portion 10 and the upper shell 21 integrally overlap in the longitudinal direction, that is, a state of being in the normal mode. In this state, the back frame 12c and the bracket 12d serving as frame members of the seat back portion 12 side, and the back frame 24 and the bracket 25 serving as frame members of the upper shell 21 side are disposed so as not to interfere with each other. Further, it is possible to tilt rearward both of the back frame 12c and the back frame 24 by the operation of the each recliner (driving-side recliners 13a and 23a and the driven-side recliners 13b and 23b) from this state. In addition, it is possible to perform the operation so that the rear tilt angle of the back frame 24 becomes greater than that of the back frame 12c.

Figure 11:
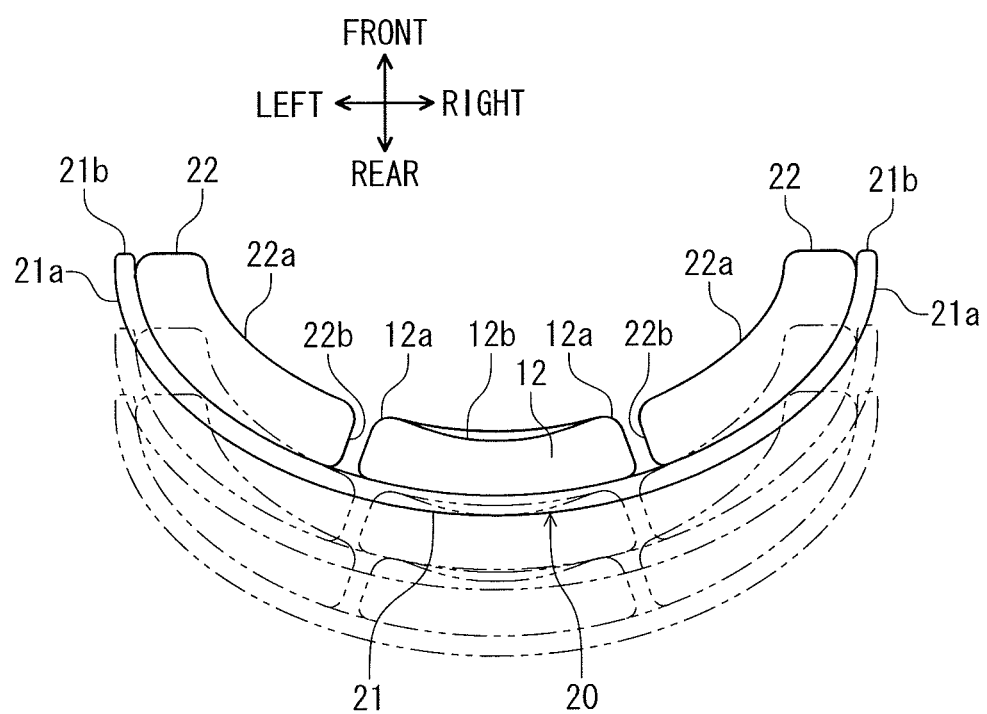
FIG. 11 is an explanatory view of the operation of the embodiment, illustrating the position change of the shell portion between a state of integrating the shell portion with the seating portion without separating and a state of separating the shell portion from the seating portion in a plan view.

FIG. 11 illustrates a change in position of the seat back portion 12 and the upper shell 21 between the state of spacing the upper shell 21 apart from the seat back portion 12 and the integrated state without being separated in a plan view. The solid line in FIG. 11 indicates a state in which the upper shell 21 is integrated with the seat back portion 12 without separating, the seating surface of the seat back portion 12 is formed along a single curved surface with the front side surface of the elastic body 22 of the upper shell 21, and the occupant P is supported on the spread seating surface along the single curved surface with ample space. In addition, since both side portions of the occupant P are covered with the both side portions 21a of the upper shell 21, the personal aesthesis is imparted.

Meanwhile, the virtual line in FIG. 11 indicates a state of spacing the upper shell 21 apart from the seat back portion 12, and at the position of the virtual line shown by the thick line, both side ends 21b of both side portions 21a of the upper shell 21 are equivalent to the both side ends 12a of the seat back portion 12 or are located behind the both side ends 12a. This position is a position at which the operation of the second motor 42 is stopped by the operation inhibition circuit 47, and the upper shell 21 is not further spaced apart from the seat back portion 12. In this state, because both side portions of the upper half body of the seated occupant P are not covered with the both side portions 21a of the upper shell 21, the occupant P can feel a sense of openness without senses of surrounding and tightness. Further, it is possible to secure the seat strength by maintaining the linkage relation between the seat back portion 12 and the upper shell 21.

The position of the virtual line shown by the thin line illustrates a case where the spaced distance of the upper shell 21 with respect to the seat back portion 12 is in an intermediate level. At this position, the occupant P is not supported by the spread seating surface along a single curved surface as in the case of the position indicated by the solid line. However, although the curved surface 22a of the elastic body 22 of the upper shell 21 and the curved surface 12b of the seat back portion 12 are spaced apart from each other in the longitudinal direction, a body of the occupant P is supported between the seat back portion 12 and the curved surface 22a of the elastic body 22 of the upper shell 21. As a result, it is possible to perform the adjustment according to preference, such as being able to feel the sense of openness to some degree, while appropriately ensuring the width of the region in which the body of the occupant P is supported, by the adjustment of the spaced distance.

Figure 15:
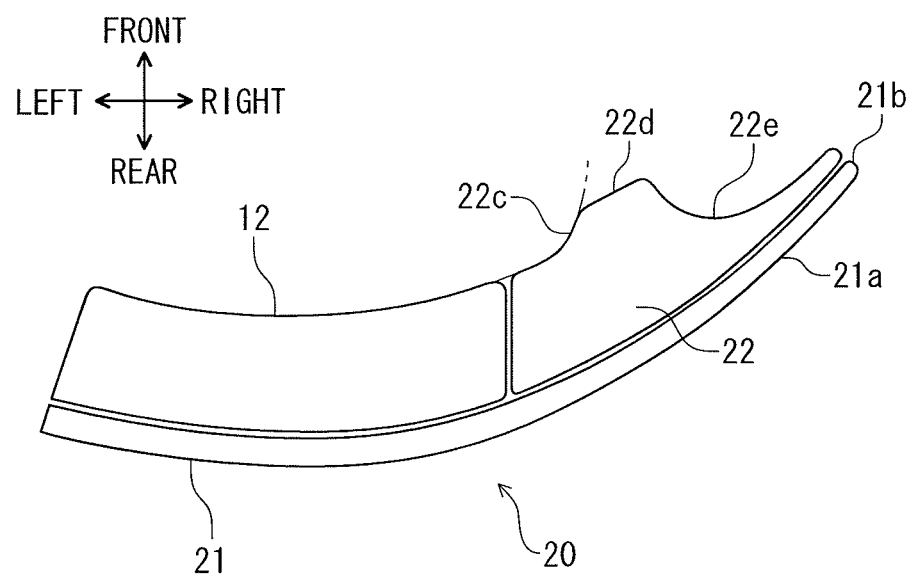
FIG. 15 is a diagram corresponding to FIG. 7 illustrating a modified example of the elastic body in the upper shell.
Figure 16:
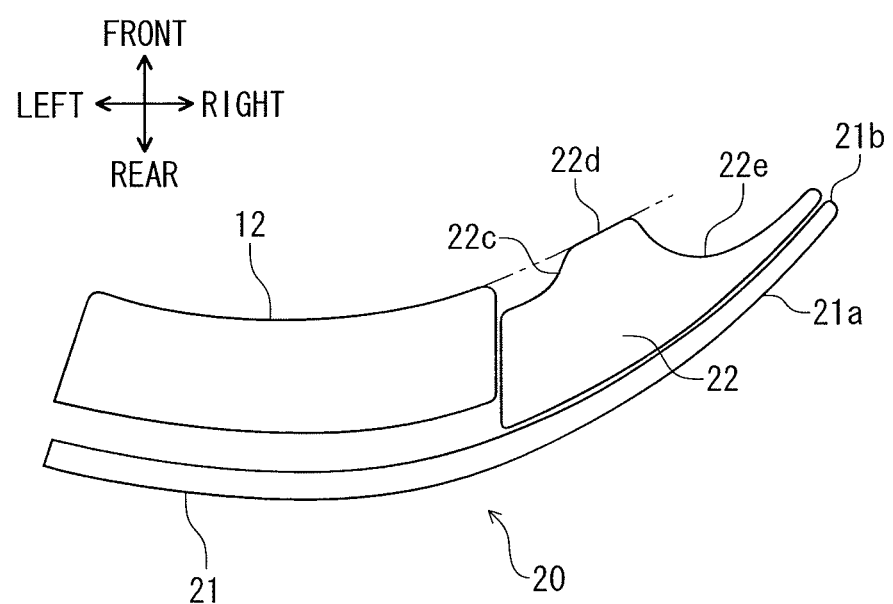
FIG. 16 is a diagram similar to FIG. 15, illustrating the state of spacing the shell portion from the seating portion.

FIGS. 15 and 16 illustrate a modified example of the elastic body 22 of the upper shell 21. In this modified example, as compared to the above-described embodiment, the shape of the elastic body 22 on the seating surface side is modified. Specifically, a protruding portion 22d protruding to the seating surface side is formed at the center portion in the lateral direction of the elastic body 22, and a recess is formed on the outside (right side in FIG. 15) of the protruding portion 22d in the lateral direction. A recessed outer curved portion 22e is formed on the seating surface side by the recess. Further, a recessed inner curved portion 22c is formed on the inside of the protruding portion 22d in the lateral direction on the seating surface side.

According to this modified example, as illustrated in FIG. 15, in the state in which the upper shell 21 is integrated with the seat back portion 12 without separating, the seating surface of the seat back portion 12 is formed along a single curved surface with the inner curved portion 22c of the elastic body 22 of the upper shell 21 as illustrated in the virtual line, and the occupant P is supported on the spread seating surface along the single curved surface with ample space.

Meanwhile, as illustrated in FIG. 16, in a state in which the upper shell 21 is slightly spaced apart from the seat back portion 12 (illustrated in a virtual line) to make the seating surface side of the protruding portion 22d follow a single curved surface with the seating surface of the seat back portion 12, the body of the occupant P is supported by the seating surface side of the protruding portion 22d and the seating surface of the seat back portion 12 along the single curved surface. Accordingly, it is possible to support a large occupant P on the spread seating surface with ample space as compared to the case of FIG. 15.

As described with reference to the embodiment, according to a first aspect of the present disclosure, there is provided a vehicle seat equipped with a seating portion configured to support an occupant in a seating posture, and a shell portion configured to cover the circumference of the seating portion including the side portions of the seated occupant from the rear. The vehicle seat includes a first moving device which is able to move the position of the seating portion in a vehicle to an arbitrary position and a second moving device which is able to arbitrarily and relatively move the shell portion to the seating portion and is able to move at least the side portions of the shell portion to a position of covering the side portions of the seated occupant and a position of not covering the side portions of the seated occupant.

In the first aspect of the present disclosure, as the vehicle seat, a bucket type seat, a shell type seat or the like are included. Also, the movement of the seating portion due to the first moving device includes various movements such as a longitudinal position, a lateral position, a height position, and a tilt angle for adjusting the seating position of the occupant.

According to the first aspect of the present disclosure, it is possible to properly move the position of the seating portion by the first moving device depending on the preference or circumstances. The position of the shell portion can be properly moved to the seating portion by the second moving device, depending on the preference or circumstances. Therefore, when enjoying the peripheral scenery or trying to talk with an occupant of the next seat, or when the occupant felt the senses of surrounding and tightness caused by the covered side portions, it is possible to make the side portions of the occupant not to be covered by the side portions of the shell portion. As a result, it is possible to make the occupant feel a sense of openness. When trying to rest, by covering the side portions of the occupant with the side portions of the shell portion, it is possible to provide a personal aesthesis of the occupant. In addition, by adjusting the degree of covering the side portions of the occupant by the side portions of the shell portion, it is possible to adjust the sense of openness and a personal aesthesis felt by the occupant to an appropriate state. Moreover, such an adjustment can be performed regardless of the position of the seating portion.

In a second aspect of the present disclosure according to the first aspect, the seating portion has a seat cushion portion which forms a seat portion at the bottom portion of the occupant, and a seat back portion which forms a backrest at the back portion of the occupant, the first moving device being a first reclining mechanism capable of changing the angle of the seat back portion of the seating portion relative to the seat cushion portion, and the second moving device being a second reclining mechanism capable of changing the angle of the shell portion relative to the seat back portion and the seat cushion portion.

According to the second aspect of the present disclosure, by operating the first reclining mechanism to adjust the angle of the seat back portion, it is possible to change the seating posture of the occupant to a normal mode of a normal seating posture and a comfort mode of a comfort posture. By operating the second reclining mechanism to adjust the angle of the shell portion, it is possible to arbitrarily select whether or not the side portions of the occupant are covered by the side portions of the shell portion.

In a third aspect of the present disclosure according to the first or second aspect, the vehicle seat further includes a separation regulating mechanism for regulating the relative spaced distance between the seating portion and the shell portion caused by the movement of the shell portion with respect to the seating portion by a predetermined amount.

In the third aspect of the present disclosure, the separation regulating mechanism may be adopted in various configurations. For example, when the first moving device and the second moving device configured to move the seating portion and the shell portion use a power source, the separation regulating mechanism can regulate the movement of the shell portion by cutting off the supply of the power source. Regardless of whether or not the first moving device and the second moving device configured to move the seating portion and the shell portion use the power source, the separation regulating mechanism can adopt a configuration for mechanically regulating the movement of the shell portion with respect to the seating portion. However, in that case, it is required that there is no problem even if the supply of the power source is continued while the movement of the shell portion is being regulated.

According to the third aspect of the present disclosure, the separation regulating mechanism may regulate the relative spaced distance of the shell portion with respect to the seating portion by a predetermined amount such that the shell portion is prevented from being spaced apart from the seating portion by a predetermined amount or more. Since the seating portion and the shell portion are not spaced apart from each other by a predetermined amount or more while capable of being spaced apart from each other, and the strength required as the seat for collision safety and the like can be secured at the strength obtained by combining the seating portion with the shell portion.

In a fourth aspect of the present disclosure according to the third aspect, the separation regulating mechanism includes a first detector for detecting the movement position of the seating portion due to the first moving device, a second detector for detecting the movement position of the shell portion due to the second moving device, and a movement inhibiting unit for stopping the movement of the shell portion due to the second moving device when the movement position of the shell portion detected by the second detector is detected to move in a direction away from the movement position of the seating portion detected by the first detector by a predetermined amount or more.

According to the fourth aspect of the present disclosure, by detecting each of the movement position of the seating portion due to the first moving device and the movement position of the shell portion due to the second moving device, when the relative spaced distance of the shell portion to the seating portion reaches a predetermined amount or more, the movement of the shell portion due to the second moving device is stopped. Therefore, it is possible to stop the movement of the shell portion, without use of unnecessary energy, and without applying excessive force to the shell portion. In contrast, in the case of a configuration which mechanically stops the movement of the shell portion by a stopper without stopping the movement function of the shell portion due to the second moving device, since the movement function of the shell portion continuously works, the energy is wasted, and the excessive force is applied to the shell portion.

In a fifth aspect of the present disclosure according to the third or fourth aspect, when the movement of the shell portion is not regulated by the separation regulating mechanism, a side end of a part corresponding to a head portion of the seated occupant at the side portions of the shell portion can be located in front of the side end of the seat back portion which forms the backrest at the occupant's back in the seating portion, and when the movement of the shell portion is regulated by the separation regulating mechanism, the side end is located in the rear of the side end of the seat back portion of the seating portion.

According to the fifth aspect of the present disclosure, even if the movement of the shell portion is regulated by the separation regulating mechanism, the side portions of the shell portion can be moved to a position at which the side portions of the head portion of the seated occupant are not covered. That is, the side portions of the shell portion can be prevented from being regulated by the movement at the position from which the side portions of the shell portion cover the side portions of the head portion of the seated occupant.

In a sixth aspect of the present disclosure according to any one of the first to fifth aspects, an occupant seating surface of the seat back portion forming the backrest in occupant's back in the seating portion has a shape which wraps around the back of the seated occupant from the rear and side, the occupant seating side is formed by a recessed curved surface, and, in a state in which the shell portion integrally overlaps the seating portion in the longitudinal direction, the side portions of the shell portion corresponding to the seat back portion is formed along a curved surface that is obtained by extending a single curved surface formed along the curved surface of the seat back portion in the lateral direction.

According to the sixth aspect of the present disclosure, in a state in which the shell portion is spaced apart from the seating portion, because the occupant seating surface of the seat back portion of the seating portion is formed by the curved surface, it is possible to individually stably support the occupant's back. Moreover, in a state in which the shell portion integrally overlaps the seating portion in the longitudinal direction, the curved surface of the seat back portion is formed along the curved surface of the side portions of the shell portion with the single curved surface, and the surface receiving the occupant's back is expanded. Therefore, the side portions of the shell portion are located on the side portions of the seating portion, and when setting a mode for providing a personal aesthesis, by ensuring a wide space around the occupant, the occupant can take a relaxed posture. When the amount of shell portion spaced apart from the seating portion is properly adjusted between a large state and a low state, the seating portion side of the side portion of the shell portion and the shell portion side of the seating portion are spaced apart from each other in the longitudinal direction, but there may be a situation in which the occupant's body is supported between the seating portion and the side end of the shell portion. In that case, while properly ensuring an extent of the region in which the occupant's body is supported, the extent can be properly adjusted depending on the preference such as being able to feel some degree of a sense of openness.

In a seventh aspect of the present disclosure according to any one of the first to sixth aspects, the seating portion and the shell portion are configured separately from each other.

According to the seventh aspect of the present disclosure, since the seating portion and the shell portion may be separately manufactured and combined with each other, it can be easily manufactured.

While specific embodiments have been described, the present invention is not limited to the exteriors and configurations, and various modifications, additions and deletions can be made within the scope that does not change the gist of the present disclosure.

What is claimed is:

1. A vehicle seat comprising:
a seating portion including a seat cushion portion and a seat back portion;
a shell portion configured to cover the seating portion from a back side to two opposite side portions of the seating portion; and
a moving mechanism that is configured to change a reclining angle, which is an angle of the seat back portion relative to the seat cushion portion, to be in two or more modes including a normal mode and a comfort mode, wherein
the reclining angle of the seat back portion in the normal mode is less than the reclining angle of the seat back portion in the comfort mode, and
the moving mechanism includes:
a first rotatable recliner that changes the reclining angle of the seat back portion of the seating portion relative to the seat cushion portion; and
a second rotatable recliner that changes an angle of the shell portion relative to the seat back portion and the seat cushion portion by rotating the shell portion to recline rearward in a state where the seat back portion is in the comfort mode.

2. The vehicle seat according to claim 1 further comprising:
a separation regulator that regulates a relative spaced distance between the seating portion and the shell portion caused by the movement of the shell portion with respect to the seating portion by a predetermined amount.

3. The vehicle seat according to claim 2, wherein the separation regulator includes:
a first detector that detects a movement position of the seating portion due to the first rotatable recliner;
a second detector that detects a movement position of the shell portion due to the second rotatable recliner; and
a movement inhibitor that stops the movement of the shell portion due to the second rotatable recliner when the movement position of the shell portion detected by the second detector is detected to move in a direction away from the movement position of the seating portion detected by the first detector by a predetermined amount or more.

4. The vehicle seat according to claim 3, wherein
the first detector detects the movement position of the seating portion due to a rotation position of a first motor that is configured to drive the first rotatable recliner, and
a second detector detects the movement position of the shell portion due to a rotation position of a second motor that is configured to drive the second rotatable recliner.

5. The vehicle seat according to claim 2, wherein
when the movement of the shell portion is not regulated by the separation regulator, the seat back portion is movable forwardly relative to the shell portion, and
when the movement of the shell portion is regulated by the separation regulator, the shell portion is prevented from being spaced apart from the seat back portion.

6. The vehicle seat according to claim 1, wherein
the seat back portion includes an occupant seating surface that that is configured to support a seat occupant in the seating portion, the occupant seating surface having a recessed curved surface, and
in a state in which the shell portion integrally overlaps the seating portion in the longitudinal direction, the shell portion has a curved surface extending in a lateral direction of the vehicle seat that conforms with a curved surface of the seating portion that extends in the lateral direction and that includes the recessed curved surface.

7. The vehicle seat according to claim 1, wherein the seating portion and the shell portion are configured separately from each other.

8. The vehicle seat according to claim 1, wherein a rotational center of the second rotatable recliner is spaced rearwardly and downwardly from a rotational center of the first rotatable recliner.

9. The vehicle seat according to claim 1, wherein the second rotatable recliner is configured to rotate at least side portions of the shell portion to a first position at which the side portions of the shell portion and a seating surface of the seating portion integrally overlap in a longitudinal direction of the vehicle seat, and to a second position at which the side portions of the shell portion are spaced relative to the seating surface of the seating portion in the longitudinal direction.

* * * * *